Oct. 25, 1966  G. G. KLIEWER  3,280,629
THERMALLY RESPONSIVE SIGNALING DEVICE
Filed April 9, 1963

GEORGE G. KLIEWER
INVENTOR

Huebner & Worrel
ATTORNEYS

United States Patent Office 3,280,629
Patented Oct. 25, 1966

3,280,629
THERMALLY RESPONSIVE SIGNALING DEVICE
George G. Kliewer, Fresno, Calif., assignor to Commodity Marketers, Inc., a corporation of California
Filed Apr. 9, 1963, Ser. No. 271,768
16 Claims. (Cl. 73—358)

This invention relates to a thermally responsive signaling device adapted to be imbedded in an article to indicate the attainment of a predetermined temperature. The invention has particular utility in connection with the cooking of articles of food which must be heated to predetermined internal temperatures before reaching a state considered palatable and which do not lend themselves to visible inspection accurately to ascertain such temperature attainment. In addition, the device may be utilized to signal the reaching of predetermined temperatures of other objects, all as circumstances may suggest.

A universal culinary problem has existed in readily determining the temperatures of certain foods during their cooking periods. Examples of such foods are poultry, large roasts and similar cuts of meats, and certain vegetables and fruits. When such foods are cooked by either baking or roasting, the required elapsed cooking time and temperature are usually estimated according to the gross weight and/or size of the food item, as well as its inherent cooking requirements. However, the most accurate method of proper cooking of such foods, is to measure precisely the internal temperature attained during the cooking period. The device of the present invention permits the use of such accurate method.

Previous devices for signaling internal food temperatures have been known. For example, the device of my copending application, Serial No. 126,261, filed July 24, 1961, entitled, "Temperature Signaling Device," utilizes a body adapted to be inserted into an article of food to be cooked. An indicator member is mounted in the body for movement between retracted and signaling positions. A spring is utilized to urge the indicator member into signaling position and a fusible shear element employed releasably to hold the indicator member in retracted position. When the device is subjected to a predetermined temperature, the shear element fuses to release the indicator member for movement by the spring into signaling position. This previous device has been excellently suited to the purpose except where precision is required in signaling exact temperatures. Even though shear elements of the same size and material are used, springs of substantially equal force are employed, and uniformity of associated parts is maintained, the release temperatures have fluctuated over ranges deemed excessive for many purposes.

Other shortcomings of previously available devices have been their tendency to be urged outwardly from certain food articles, such as meat, into which they have been inserted. This outward urging results from the stresses in tension of fibers comprising the article and the variations in such stresses during the cooking period.

Accordingly, it is an object of the present invention to provide a thermally responsive signaling device for the purposes described having improved accuracy.

Another object is to provide a temperature signaling device constructed of a minimum number of parts thereby facilitating assembly of the device.

Another object is to provide a thermally responsive signaling device which utilizes a fusible latch element held in compression by a signaling member and adapted to be fused at a predetermined temperature.

Another object is to provide such a temperature signaling device which can be constructed in miniature size and at an extremely low unit-cost.

A further object of the invention is to provide such a device which is easily inserted into an article of food, is accurately held in selected position and is capable of signaling with precision the attainment of a predetermined temperature.

These, together with other objects, will become more fully apparent upon reference to the following description and accompanying drawings.

Figure 1:
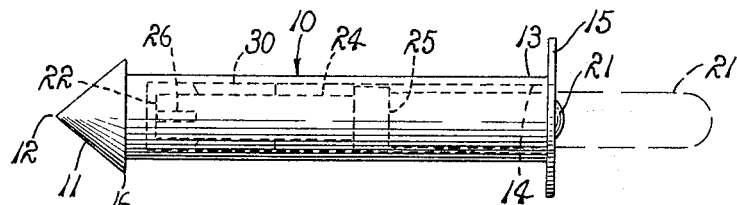
FIG. 1 is a view in side elevation showing a signaling device incorporating the principles of the present invention, the signaling member thereof being shown in dashed lines in an extended signaling position.

Referring more particularly to the drawing, the device of the present invention incorporates an elongated fluid-tight outer housing or body 10 having an inner forward end 11 provided with a penetrating tip 12. An open outer end 13 is opposite to the inner end 11 and provides access to a longitudinally extended cavity 14 provided in the housing. In a commercial embodiment of the invention, the cavity 14 is cylindrical in form, as shown. The outer end 13 is provided with a radially extended flange 15 circumscribing the housing and serves to limit the penetration of the device into an article, not shown, the attained internal temperature of which is to be signaled by the device. To prevent the device from being urged outwardly following penetration into such an article, the inner end 11 is provided with an annular flange 16, which in axial section is in the form of a barb. The flange 16 permits penetration of the device into such an article while preventing withdrawal thereof, except upon the application of a force sufficient to overcome the retaining force of the fibers of the article.

The housing 10 including the inner tip 11 is preferably formed of a chemically inert material, such as nylon or polypropylene. In addition to the aforementioned materials, aluminum is a suitable material for the housing 10, or any other material may be utilized which is substantially chemically inert and does not impart a deleterious flavor, taste or other harmful effect to food. Such materials are satisfactory so long as they possess a thermal conductivity at least approaching that of the article being cooked. This is a necessary characteristic so that the internal temperature of the article can be transmitted by conduction to a fusible latch element 18 incorporated into the device and subsequently described.

Figure 6:
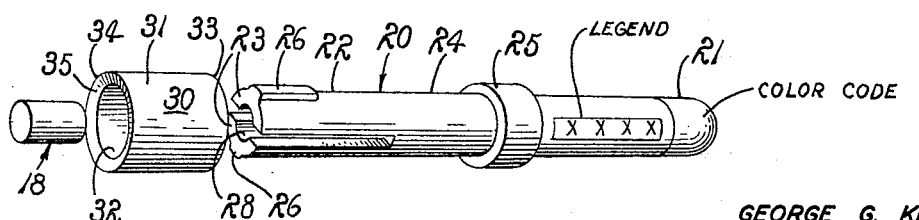
FIG. 6 is a fragmentary, perspective view of the signaling member, locking sleeve, and fusible latch of the device shown in FIG. 1.

An indicator rod 20 is provided with an outer signaling end 21 and an inner bifurcated end 22 comprising a pair of laterally opposed legs 23. The rod includes an intermediate shank portion 24 integrally joining the outer and inner ends 21 and 22. A collar 25 radially projects from the rod and is disposed adjacent to the signaling portion of the rod. As illustrated in FIG. 6, the signaling end may be provided with a suitable indicating color, such as red, as well as any appropriate legend to indicate the attainment of a predetermined internal temperature.

As can be seen more clearly in FIG. 6, each of the legs 23 is provided with a respective radially projecting stop lug 26. Referring again to FIG. 2, each of the stop lugs 26 is provided with a tapered surface 27, and in a commercial embodiment of the device, the surface 27 is tapered at an angle of 20° with respect to a diametral plane. Each of the legs is provided with an arcuate recess 28 forming a fuse cavity extending axially a predetermined distance and dimensioned to admit the latch element 18.

An annular sleeve 30 having an external periphery 31 and an internal bore 32 is dimensioned to be inserted axially within the cavity 14 for frictional engagement with the housing by means of the periphery 31. The sleeve provides an outer end 33 and an inner end 34, the latter affording a tapered surface 35, which is geometrically complementary to the tapered surfaces 27. In the aforementioned commercial embodiment, the surface 35 is also tapered at a 20° angle with respect to a diametral plane.

A guide bushing 40 is provided with an external periphery 41 and an internal bore 42, the respective dimensions of which are such as to permit encircling of the signaling end 21 of the rod 20 and reception of the bushing within the cavity 14 in substantially sealing relationship. The periphery 41 is adapted for frictional engagement with the housing 10 thereby serving as a stop member to limit axial outward movement of the rod. The bore 42 is sufficiently large to permit longitudinal movement of the rod to an extended position while forming a substantially fluid-tight seal between the bushing and the rod.

A compression spring 45 circumscribes the intermediate portion 24 of the rod 20 and is adapted to engage the collar 25 and the outer end 33 of the sleeve 30. When so disposed, the spring constitutes a biasing means adapted to urge the indicator rod 20 toward an extended signaling position.

Figure 2:
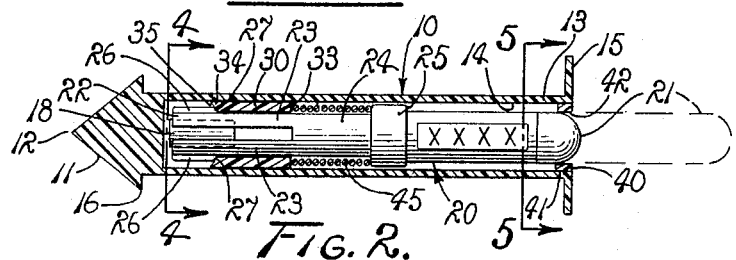
FIG. 2 is a view in longitudinal, vertical section of the device of FIG. 1, and shows the signaling member in a retracted position.
Figure 4:
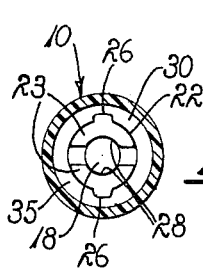
FIG. 4 is a view in vertical, transverse section taken on line 4—4 of FIG. 1.
Figure 5:
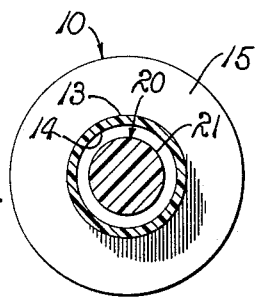
FIG. 5 is a view in vertical, transverse section taken on line 5—5 of FIG. 1.

The fusible latch element 18, in the form of a cylindrical pin, is disposed between the opposed legs 23 in the arcuate recesses 28 provided therein. When so disposed as shown in FIGS. 2 and 4, the force exerted by the spring 45 acting in conjunction with the cooperating tapered surfaces 27 and 35, is effective to exert a force in compression on the latch element 18. So long as the latch element remains in a solid state, the indicator rod 20 is maintained in a retracted position as shown in FIG. 2.

*Operation*

The operation of the described embodiment of the subject invention is believed to be readily apparent and is briefly summarized at this point. Assuming that the device of the present invention is to be used to indicate the attainment of a predetermined temperature by an article of food, such as a turkey being roasted, the device is preferably inserted into a meaty portion thereof affording the largest mass so that accurate results can be obtained by the device. In the case of roasted turkeys, a commonly accepted satisfactory internal temperature which must be attained during roasting is approximately 178° F. Accordingly, the fusible latch element 18 must be formed of a material having a fusing or melting temperature substantially identical to the ideal internal temperature to roast the turkey to a satisfactory condition. The fusing or melting temperature of the latch element 18 must be such as to release the indicator rod 20 at the temperature, thereby permitting the spring 45 to move the rod to an extended signaling position.

An example of a themoplastic material for the latch element 18 is a metal alloy consisting by weight of 57% bismuth, 17% tin, and 27% indium. Using such a metal alloy as the latch element in a commercial embodiment of the invention and employing a 20° angle of the tapered surfaces 27 and 35, the devices of the present invention have successfully indicated an attained internal temperature of 178° F. with a maximum variance of only 1° F. Other suitable thermoplastic materials will occur to persons skilled in the art.

With other foods, the ideal internal temperature is different from that of a turkey. Examples of metal alloys suitable to release the indicator rod 20 at respective predetermined internal temperature are as follows:

136° F.:
    49.00 _____ bismuth.
    18.00 _____ lead.
    12.00 _____ tin.
    21.00 _____ indium.

158° F.:
    50.00 _____ bismuth.
    26.70 _____ lead.
    13.30 _____ tin.
    10.00 _____ cadmium.

197° F.:
    51.60 _____ bismuth.
    40.20 _____ lead.
    8.20 _____ cadmium.

203° F.:
    52.50 _____ bismuth.
    32.00 _____ lead.
    15.50 _____ tin.

Figure 3:
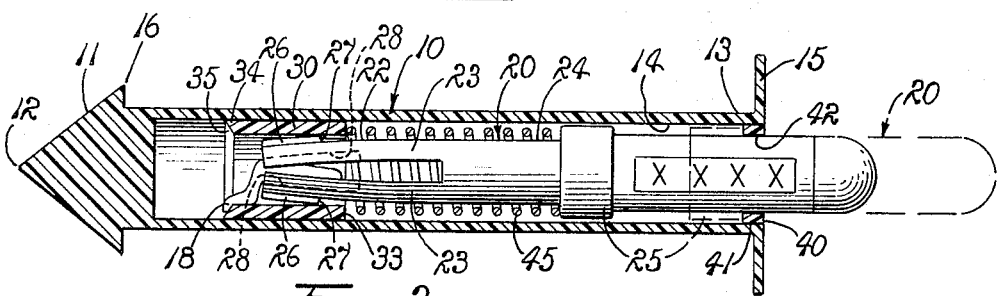
FIG. 3 is a view similar to FIG. 2 but shows the signaling member in a released, extended, signaling position.

Upon a sufficiently high internal temperature being reached by the article into which the device has been inserted, and the temperature being transmitted to the fusible latch element 18 by means of the thermally conductive housing, the latch element approaches a liquid or fluid state. As illustrated in FIG. 3, the latch element, being held in compression while in a retracted position, also fails in compression upon reaching its respective fusing temperature. Accordingly, since the latch element fails in compression rather than in shear, accurate release temperatures can be faithfully reproduced by each individual embodiment of the invention.

Upon fusing of the latch element 18, the spring 45 urges the indicator rod outwardly from the housing toward an extended signaling position. By reason of the force exerted by the spring 45, the inner bifurcated end 22 of the rod 20 is compressed so that the laterally opposed legs 23 move toward each other and permit the stop lugs 26 to pass through the annular locking sleeve 30. This condition is shown in FIG. 3. The spring 45 is of a sufficient length and spring rate to urge the rod 20 to a completely extended signaling position, as shown fragmentarily in dashed lines. In such an extended signaling position, the collar 25 is adapted to engage the bushing 42 in substantially fluid-tight sealing relationship. In view of the bushing 42 being pressed into the cavity 14 so as to be in sealing relationship with the housing 10, the indicator rod 25 is likewise in sealing relationship with the housing 10 through the bushing 40.

In addition to the faithful reproduction of releasing temperatures, the device can be constructed in miniature size, such as an overall length of less than 1.5 inches and of a diameter less than .25 inch, thereby facilitating the insertion of the device into an article of food. Also, the miniature size reduces the unit-cost of the device and permits an economy heretofore not achieved by such devices.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A thermally responsive signaling device, adapted to be inserted int an article and to indicate the attainment by the article of a predetermined internal temperature, comprising an elongated outer housing provided with a cavity therein and having a penetrating tip at one end and an opposite open end leading from the cavity; an indicator member substantially disposed within said cavity and adapted for movement between a retracted position to indicate a condition existing at an internal temperature below said predetermined temperature and an extended position to indicate a condition existing at an internal temperature above said predetermined temperature; biasing means engaging the indicator member within the housing urging said member toward the extended signaling position; and latching means carried within the housing cavity, said latching means comprising: engageable elements fixed, respectively, relative to the housing and indicator member, said elements being adapted to assume a mutually engaged condition maintaining the indicator member in the retracted position and a mutually disengaged condition permitting the indicator member to move to the extended position under the influence of the biasing means; and a fusible release element normally held in compression to maintain said engageable elements in engaged condition, said release element, upon being heated to a predetermined temperature, releasing said engageable elements to the disengaged condition.

2. A thermally responsive signaling device, adapted to be inserted into an article and to indicate the attainment by the article of a predetermined internal temperature, comprising an elongated housing provided with a cavity therein and having a penetrating tip at one end and an opposite open end leading from the cavity; external means carried by the housing to limit penetration thereof into the article; an indicator member substantially disposed within said cavity and adapted for movement between a retracted position to indicate a condition existing at an internal temperature below said predetermined temperature and an extended position to indicate a condition existing at an internal temperature above said predetermined temperature; biasing means interposed the indicator member and the housing urging said member toward the extended position; and latching means carried within the housing cavity, said latching means comprising: engageable elements fixed, respectively, relative to the housing and indicator member, said elements being adapted to assume a mutually engaged condition maintaining the indicator member in the retracted position and a mutually disengaged condition permitting the indicator member to move to the extended position under the influence of the biasing means; and a fusible release element normally held in compression to maintain said engageable elements in engaged condition, said release element, upon being heated to a predetermined temperature, fusing to release said engageable elements to the disengaged condition.

3. A thermally responsive signaling device, adapted to be inserted into an article and to indicate the attainment by the article of a predetermined internal temperature, comprising an elongated housing provided with a cavity therein and having a penetrating tip at one end and an opposite open end leading from the cavity; means carried by the housing normally permitting unidirectional penetration by the device; an indicator member substantially disposed within said cavity and adapted for movement between a retracted position to indicate a condition existing at an internal temperature below said predetermined temperature and an extended position to indicate a condition existing at an internal temperature above said predetermined temperature; biasing means interposed the indicator member and the housing urging said member toward the extended position; and latching means carried within the housing cavity, said latching means comprising: engageable elements fixed, respectively, relative to the housing and indicator member, said elements being adapted to assume a mutually engaged condition maintaining the indicator member in the retracted position and a mutually disengaged condition permitting the indicator member to move to the extended position under the influence of the biasing means; and a fusible release element normally held in compression to maintain said engageable elements in engaged condition, said release element, upon being heated to a predetermined temperature, fusing to release said engageable elements to the disengaged condition.

4. A thermally responsive signaling device adapted to be inserted into an article and to indicate the attainment by the article of a predetermined internal temperature, the device comprising an elongated fluid-tight outer housing provided with a cavity therein and having a penetrating tip at one end and an opposite open end leading from the cavity; external means carried by the housing to limit penetration thereof into the article; means carried by the housing normally permitting unidirectional penetration by the device; an indicator member substantially disposed within said cavity and adapted for movement between a retracted position to indicate a condition existing at an internal temperature below said predetermined temperature and an extended position to indicate a condition existing at an internal temperature above said predetermined temperature; biasing means interposed the indicator member and the housing urging said member toward the extended position; and latching means carried within the housing cavity, said latching means comprising: engageable elements fixed, respectively, relative to the housing and indicator member, said elements being adapted to assume a mutually engaged condition maintaining the indicator member in the retracted position and a mutually disengaged condition permitting the indicator member to move to the extended position under the influence of the biasing means; and a fusible release element normally held in compression to maintain said engageable elements in engaged condition, said release element, upon being heated to a predetermined temperature, fusing to release said engageable elements to the disengaged condition.

5. A thermally responsive signaling device comprising an elongated body adapted for insertion into an article which is subsequently to be heated and to have its attainment of a predetermined temperature signaled by the device, the body having an elongated cavity providing an open outwardly disposed end when the body is so inserted; an indicator mounted in the cavity for movement between predetermined retracted and signaling positions, said indicator having an inner end laterally expansible to resist movement of the indicator from a retracted position to a signaling position and contractible to accommodate such movement, said inner end normally tending to contract and having an endwardly disposed fuse cavity; resilient means urging the indicator to signaling position; and a fusible element compressed within the fuse cavity releasably maintaining the inner end of the indicator in expanded condition and the indicator in retracted position.

6. A thermally responsive signaling device comprising an elongated body adapted for insertion into an article which is subsequently to be heated and to have its attainment of a predetermined temperature signaled by the device, the body having an elongated cavity providing an open outwardly disposed end when the body is so inserted; an indicator mounted in the cavity for movement between predetermined retracted and signaling positions, said indicator having a divided inner end providing laterally flexible portions having a fuse cavity therebetween; stop means integral with the body outwardly of the flexible portions; a thermoplastic fuse element compressed within the cavity and releasably holding said flexible portions outwardly against the stop means; and resilient means urging the indicator to signaling position resisted by retention of the indicator in retracted position by the fuse element holding the flexible portions of the inner end of the indicator outwardly against the stop means.

7. A thermally responsive signaling device adapted to be inserted into an article and to indicate the attainment by the article of a predetermined internal temperature, the device comprising an elongated housing provided with a longitudinally extended cavity therein and having a tapered penetrating tip at an inner forward end and an opposite end providing an opening leading from the cavity; an elongated indicator rod disposed within said cavity and arranged for axial movement relative to the housing between a normally retracted position and an extended signaling position, the rod having a bifurcated inner end defining bifurcations, an outer signaling end and an interconnecting intermediate portion; a retaining sleeve disposed within the housing and loosely circumscribing the intermediate portion of said rod, the sleeve being rigidly secured to the housing in frictional engagement therewith; stop means carried by the rod adjacent to said signaling end and axially spaced from said sleeve; biasing means interposed the sleeve and said stop means to urge said rod toward and extended position; inner stop means carried by the bifurcated end of said rod and affording a tapered surface presented toward said sleeve; and a fusible latch element disposed between said bifurcations and compressed therebetween under the influence of said biasing means to maintain the rod in a retracted position, and being adapted to release the rod upon the attainment of said predetermined temperature.

8. The device of claim 7 wherein said sleeve is provided with an inner end adjacent to said tapered stop means and affording a surface geometrically complementary to said tapered stop means.

9. The device of claim 8 wherein said tapered stop means and said surface are disposed at an angle twenty degrees relative to a diametral plane.

10. A thermally responsive signaling device adapted to be inserted into an article and to indicate the attainment by the article of a predetermined internal temperature, the device comprising an elongated fluid-tight outer housing provided with an axially extended cylindrical cavity therein and having a tapered penetrating tip at an inner forward end and an opposite end providing an opening leading from the cavity; an annular flange rigidly carried by the housing adjacent to and rearwardly of the tip, the flange in axial section being in the form of a tapered rearwardly directed holding barb permitting unidirectional penetration of the article by the housing; an annular flange fixed to the housing and radially extended therefrom in circumscribing relation to said opening; an elongated indicator rod disposed within said cavity in a normally retracted position and adapted for axial movement relative to the housing to an extended signaling position, the rod having a cylindrical signaling portion at the outer end in juxtaposition to said open end; an annular collar radially projecting from the signaling portion and spaced from said outer end; an inner bifurcated end forming a pair of laterally opposed legs, each of said legs bearing a radially projecting stop lug affording respective tapered stop shoulders, the legs, when in a normal substantially parallel unstressed condition, being adapted to hold the lugs at a predetermined radial spacing, the legs also being provided with laterally opposed arcuate recesses extended axially of each leg a predetermined distance from the inner end thereof; the rod having an intermediate portion integrally joining said legs and said signaling portion; a locking sleeve disposed within the cavity and in frictionally secured relationship with the housing and having opposed inner and outer ends, the sleeve being adapted loosely to receive the intermediate portion of said rod as well as the legs thereof when said legs are in a condition stressed inwardly toward each other so as to be disposed in closer proximity than when in said unstressed condition, the inner end of said sleeve affording a tapered surface presented toward and geometrically complementary to said stop shoulders; a compression spring circumscribing the intermediate portion of said rod and interposed said collar and the outer end of said sleeve to urge the rod toward an extended signaling position; and a fusible latch element disposed in the recesses of the inner ends of said legs and held in compression therebetween to maintain the rod in a retracted position and being adapted to release the rod upon the attainment of said predetermined temperature.

11. The device of claim 10 wherein said stop shoulders are tapered at an angle of twenty degrees measured from a diametral plane.

12. A thermally responsive signaling device adapted to be inserted into an article and to indicate the attainment by the article of a predetermined internal temperature, the device comprising an elongated fluid-tight outer housing provided with an axially extended cylindrical cavity therein and having a tapered penetrating tip at an inner forward end and an opposite end providing an opening leading from the cavity; an annular flange rigidly carried by the housing adjacent to and rearwardly of the tip, the flange in axial section being in the form of a tapered rearwardly directed holding barb permitting unidirectional penetration of the article by the housing; an annular flange fixed to the housing and radially extended therefrom in circumscribing relation to said opening; an elongated indicator rod disposed within said cavity in a normally retracted position and adapted for axial movement relative to the housing to an extended signaling position, the rod having a cylindrical signaling portion at the outer end in juxtaposition to said open end, an annular collar radially projecting from the signaling portion and spaced from said outer end, an inner bifurcated end forming a pair of laterally opposed legs, each of said legs bearing a radially projecting stop lug affording respective tapered stop shoulders, the legs, when in a normal substantially parallel unstressed condition, being adapted to hold the lugs at a predetermined radial spacing, the legs also being provided with laterally opposed arcuate recesses extended axially of each leg a predetermined distance from the inner end thereof; the rod having an intermediate portion integrally joining said legs and said signaling portion; a locking sleeve disposed within the cavity and in frictionally secured relationship with the housing and having opposed inner and outer ends, the sleeve being adapted loosely to receive the intermediate portion of said rod as well as the legs thereof when said legs are in a condition stressed inwardly toward each other so as to be disposed in closer proximity than when in said unstressed condition, the inner end of said sleeve affording a tapered surface presented toward and geometrically complementary to said stop shoulders; a compression spring circumscribing the intermediate portion of said rod and interposed said collar and the outer end of said sleeve to urge the rod toward an extended signalling position; means carried by said housing to limit outward movement of said rod; and a fusible latch element disposed in the recesses of the inner ends of said legs and held in compression therebetween to maintain the rod in a retracted position and being adapted to release the rod upon the attainment of said predetermined temperature.

13. A thermally responsive signaling device adapted to be inserted into an article and to indicate the attainment by the article of a predetermined internal temperature, the device comprising an elongated fluid-tight outer housing provided with an axially extended cylindrical cavity therein and having a tapered penetrating tip at an inner forward end and an opposite end providing an opening leading from the cavity; an annular flange rigidly carried by the housing adjacent to and rearwardly of the tip, the flange in axial section being in the form of a tapered rearwardly directed holding barb permitting unidirectional penetration of the article by the housing; an annular flange fixed to the housing and radially extended therefrom in circumscribing relation to said opening; an elongated indicator rod disposed within said cavity in a normally retracted position and adapted for axial movement relative to the housing to an extended signaling position, the rod having a cylindrical signaling portion at the outer end in juxtaposition to said open end, an annular collar radially projecting from the signaling portion and spaced from said outer end, an inner bifurcated end forming a pair of laterally opposed legs, each of said legs bearing a radially projecting stop lug affording respective tapered stop shoulders, the legs, when in a normal substantially parallel unstressed condition, being adapted to hold the lugs at a predetermined radial spacing, the legs also being provided with laterally opposed arcuate recesses extended axially of each leg a predetermined distance from the inner end thereof; the rod having an intermediate portion integrally joining said legs and said signaling portion; a locking sleeve disposed within the cavity and in frictionally secured relationship with the housing and having opposed inner and outer ends, the sleeve being adapted loosely to receive the intermediate portion of said rod as well as the legs thereof when said legs are in a condition stressed inwardly toward each other so as to be disposed in closer proximity than when in said unstressed condition, the inner end affording a tapered surface presented toward and geometrically complementary to said stop shoulders; a compression spring circumscribing the intermediate portion of said rod and interposed said collar and the outer end of said sleeve to urge the rod toward an extended signaling position; means carried by said housing to limit outward movement of said rod; means encircling the signaling portion of said rod and closing said open end in substantially sealing relationship; and a fusible latch element disposed in the recesses of the inner ends of said legs and held in compression therebetween to maintain the rod in a retracted position and being adapted to release the rod upon the attainment of said predetermined temperature.

14. A thermally responsive signaling device adapted to be inserted into an article and to indicate the attainment by the article of a predetermined internal temperature, the device comprising an elongated fluid-tight outer housing provided with an axially extended cylindrical cavity therein and having a tapered penetrating tip at an inner forward end and an opposite end providing an opening leading from the cavity; an annular flange rigidly carried by the housing adjacent to and rearwardly of the tip, the flange in axial section being in the form of a tapered rearwardly directed holding barb permitting unidirectional penetration of the article by the housing; an annular flange fixed to the housing and radially extended therefrom in circumscribing relation to said opening; an elongated indicator rod disposed within said cavity in a normally retracted position and adapted for axial movement relative to the housing to an extended signaling position, the rod having a cylindrical signaling portion at the outer end in juxaposition to said open end, an annular collar radially projecting from the signaling portion and spaced from said outer end, an inner bifurcated end forming a pair of laterally opposed legs, each of said legs bearing a radially projecting stop lug affording respective tapered stop shoulders, the legs, when in a normal substantially parallel unstressed condition, being adapted to hold the lugs at a predetermined radial spacing, the legs also being provided with laterally opposed arcuate recesses extended axially of each leg a predetermined distance from the inner end thereof; the rod having an intermediate portion integrally jointing said legs and said signaling portion; a locking sleeve disposed within the cavity and in frictionally secured relationship with the housing and having opposed inner and outer ends, the sleeve being adapted loosely to receive the intermediate portion of said rod as well as the legs thereof when said legs are in a condition stressed inwardly toward each other so as to be disposed in closer proximity than when in said unstressed condition, the inner end affording a tapered surface presented toward and geometrically complementary to said stop shoulders; a compression spring circumscribing the intermediate portion of said rod and interposed said collar and the outer end of said sleeve to urge the rod toward an extended signaling position; a guide bushing disposed within the cavity adjacent to the open end of said housing and in sealing, frictionally secured relationship therewith and adapted to encircle the signaling portion of said rod in substantially sealing relationship while permitting axial movement to an extended position; and a fusible latch element disposed in the recesses of the inner ends of said legs and held in compression therebetween to maintain the rod in a retracted position and being adapted to release the rod upon the attainment of said predetermined temperature.

15. The signaling device of claim 14 wherein said fusible latch element is formed of a thermoplastic material characterized by having a melting point of 178° Fahrenheit.

16. The signaling device of claim 15 wherein said thermoplastic material is a metal alloy consisting of 57% bismuth, 17% tin, and 26% indium.

References Cited by the Examiner
UNITED STATES PATENTS

| | | | |
|---|---|---|---|
| 945,978 | 1/1910 | Nielson et al. | 73—358 |
| 3,090,235 | 5/1963 | Houser | 73—358 |
| 3,140,611 | 7/1964 | Kliewer | 73—358 |

LOUIS R. PRINCE, *Primary Examiner.*

DONN McGIEHAN, *Assistant Examiner.*